United States Patent
Sonoda

(10) Patent No.: US 10,875,666 B2
(45) Date of Patent: Dec. 29, 2020

(54) PASSENGER BOARDING BRIDGE

(71) Applicant: SHINMAYWA INDUSTRIES, LTD., Takarazuka (JP)

(72) Inventor: Yoshihiro Sonoda, Takarazuka (JP)

(73) Assignee: SHINMAYWA INDUSTRIES, LTD., Takarazuka (JP)

( * ) Notice: Subject to any disclaimer, the term of this patent is extended or adjusted under 35 U.S.C. 154(b) by 0 days.

(21) Appl. No.: 16/630,069

(22) PCT Filed: Jul. 13, 2017

(86) PCT No.: PCT/JP2017/025543
§ 371 (c)(1),
(2) Date: Jan. 10, 2020

(87) PCT Pub. No.: WO2019/012648
PCT Pub. Date: Jan. 17, 2019

(65) Prior Publication Data
US 2020/0165009 A1 May 28, 2020

(51) Int. Cl.
*E01D 1/00* (2006.01)
*B64F 1/305* (2006.01)

(52) U.S. Cl.
CPC ..................... *B64F 1/305* (2013.01)

(58) Field of Classification Search
CPC ....................................................... B64F 1/305
USPC ........................................... 14/71.5; 340/958
See application file for complete search history.

(56) References Cited

U.S. PATENT DOCUMENTS

| 3,690,599 | A | * | 9/1972 | Hager | B64F 1/002 340/958 |
| 5,226,204 | A |  | 7/1993 | Schoenberger et al. |  |
| 5,675,661 | A | * | 10/1997 | Richman | B64F 1/002 340/958 |
| 5,761,757 | A |  | 6/1998 | Mitchell et al. |  |
| 2003/0120358 | A1 |  | 6/2003 | Hutton |  |
| 2004/0187234 | A1 | * | 9/2004 | Hutton | B64F 1/3055 14/71.5 |

(Continued)

FOREIGN PATENT DOCUMENTS

| JP | S59156897 A | 9/1984 |
| JP | S6343900 A | 2/1988 |

(Continued)

*Primary Examiner* — Raymond W Addie
(74) *Attorney, Agent, or Firm* — Alleman Hall Creasman & Tuttle LLP

(57) ABSTRACT

A passenger boarding bridge for docking a cab with an aircraft. The passenger boarding bridge includes: a tunnel unit; a cab; a drive wheel provided on the tunnel unit or the cab; a rotational mechanism configured to rotate the cab; a controller configured to control the drive wheel and the rotational mechanism; a camera configured to capture an image of an entrance of an aircraft; and an entrance position calculator configured to detect the entrance of the aircraft based on the image and calculate horizontal positional information of the entrance. The controller is, when the cab is at a predetermined standby position from which the cab starts moving at a time of performing docking of the cab with the entrance, configured to: calculate a target position based on the horizontal positional information; and move the cab from the standby position to the target position.

13 Claims, 8 Drawing Sheets

(56) References Cited

U.S. PATENT DOCUMENTS

2005/0198750 A1    9/2005   Spencer et al.
2008/0060145 A1    3/2008   Hutton
2008/0098538 A1    5/2008   Hutton
2008/0098539 A1    5/2008   Hutton
2008/0231472 A1    9/2008   Hutton

FOREIGN PATENT DOCUMENTS

| JP | H06199297 A | 7/1994 |
| JP | H08072798 A | 3/1996 |
| JP | 2005104193 A | 4/2005 |
| JP | 2005518308 A | 6/2005 |

* cited by examiner

PASSENGER BOARDING BRIDGE

TECHNICAL FIELD

The present invention relates to a passenger boarding bridge.

BACKGROUND ART

At an airport, a passenger boarding bridge that connects between a terminal building and an aircraft is used for boarding onto and disembarking from the aircraft. It has been proposed to automatically move such a passenger boarding bridge (see Patent Literatures 1, 2, and 3, for example).

For example, as described in Patent Literature 1, a passenger boarding bridge includes: a tunnel unit including a walkway; a cab rotatably provided on the distal end of the tunnel unit; drive wheels provided on the tunnel unit or the cab; a rotational mechanism configured to rotate the cab; and a control device configured to control the drive wheels and the rotational mechanism to move the cab from a standby position and stop the cab at a predetermined target position in such an orientation that the cab faces the entrance of an aircraft. Patent Literature 1 describes that the target position is set based on the following: an actual docking position of the cab when the cab is docked with the entrance of the aircraft for the first time; and the amount of deviation between an actual stop position of the aircraft and a predetermined stop position of the aircraft. Patent Literature 1 also describes that at the time of docking the cab with the entrance of the aircraft for the second or subsequent time, the drive wheels and the rotational mechanism are controlled based on the set target position. Patent Literature 1 further describes that at the time of docking the cab with the entrance of the aircraft for the second or subsequent time, when the amount of deviation from the predetermined stop position of the aircraft is inputted, the target position is corrected in accordance with the inputted amount of deviation.

Patent Literatures 2 and 3 each disclose a boarding/disembarking apparatus for aircraft. The boarding/disembarking apparatus for aircraft is moved closer and positioned at the front of a predicted position of an aircraft door in accordance with information given to a control device in advance. Based on a video image from a video camera provided on the head of the boarding/disembarking apparatus, a relative positional relationship between the aircraft door and the boarding/disembarking apparatus is measured, and based on the obtained information, the movement of the boarding/disembarking apparatus is controlled until the boarding/disembarking apparatus comes into contact with the aircraft door.

CITATION LIST

Patent Literature

PTL 1: Japanese Laid-Open Patent Application Publication No. 2005-104193

PTL 2: Japanese Laid-Open Patent Application Publication No. S63-43900

PTL 3: Japanese Laid-Open Patent Application Publication No. S59-156897

SUMMARY OF INVENTION

Technical Problem

In the case of adopting the above-described configuration of Patent Literature 1, at the time of docking the cab for the first time, a manual operation by an operator is required. Usually, a passenger boarding bridge is used for a plurality of different types of aircrafts. Therefore, in the case of adopting the configuration of Patent Literature 1, the manual operation by the operator is required for each type of aircraft at the time of docking the cab for the first time. The manual operation for docking the cab with the aircraft requires high skills, and is an onerous operation that demands proficiency. Assume a case where the aircraft deviates from the predetermined stop position. In this case, if the configuration of Patent Literature 1 is adopted, it is essential that the amount of the deviation be precisely measured and inputted both when the target position is set at the first docking and when the target position is corrected at the second or subsequent docking.

In Patent Literatures 2 and 3, first, the predicted position of the aircraft door is set as a target, and the boarding/disembarking apparatus is moved closer and positioned at the front of the predicted position. Thereafter, based on a video image from the video camera, the relative positional relationship between the aircraft door and the boarding/disembarking apparatus is measured, and based thereon, the movement of the boarding/disembarking apparatus is controlled until the boarding/disembarking apparatus comes into contact with the aircraft. Therefore, if the aircraft has stopped in a manner to deviate from a predetermined stop position, it means that the predicted position of the aircraft door set as the target first deviates from an actual position. Accordingly, depending on the degree of the deviation, it becomes necessary to greatly change the advancing direction of the boarding/disembarking apparatus at the front of the predicted position. In this case, the moving distance of the boarding/disembarking apparatus greatly increases, causing significant increase in a time required for the boarding/disembarking apparatus to come into contact with the aircraft. Additionally, in some cases, it may become necessary to turn the boarding/disembarking apparatus, for example, move the boarding/disembarking apparatus backward temporarily. Patent Literatures 2 and 3 give almost no consideration to a case where the aircraft has stopped in a manner to deviate from a predetermined stop position. Accordingly, it is considered that there will be a case where when the boarding/disembarking apparatus is moved closer and positioned at the front of the predicted position of the aircraft door, the aircraft door cannot be recognized by the video camera depending on the degree of the deviation.

The present invention has been made to solve the above-described problems. An object of the present invention is to provide a passenger boarding bridge that is capable of, even in a case where an aircraft has stopped in a manner to deviate from a predetermined stop position, docking a cab with the aircraft without measuring the amount of the deviation, while making it possible to eliminate or simplify operations performed by an operator.

Solution to Problem

In order to achieve the above object, a passenger boarding bridge according to one aspect of the present invention includes: a tunnel unit including a walkway; a cab rotatably provided on a distal end of the tunnel unit; a drive wheel provided on the tunnel unit or the cab; a rotational mechanism configured to rotate the cab; a controller configured to control the drive wheel to move the cab, control the rotational mechanism to rotate the cab such that the cab is in an orientation in which a distal end part of the cab faces an entrance of an aircraft, and cause the distal end part of the cab to be docked with the entrance; an entrance image capturing camera mounted to the cab and configured to capture an image of the entrance of the aircraft; and an entrance position calculator configured to detect the entrance of the aircraft based on the image of the entrance, which is captured by the entrance image capturing camera, and calculate horizontal positional information of the entrance. The controller is, when the cab is at a predetermined standby position from which the cab starts moving at a time of performing docking of the cab with the entrance, configured to: calculate a target position based on the horizontal positional information of the entrance, which is calculated by the entrance position calculator, the target position being a destination position to which the cab is moved for docking the cab with the entrance; and move the cab from the standby position to the target position.

According to the above configuration, the controller: calculates the target position, i.e., a destination position to which the cab is moved, based on the horizontal positional information of the entrance, which is calculated based on the image of the entrance captured by the entrance image capturing camera; and moves the cab from the standby position to the target position. Therefore, even in a case where the aircraft has stopped in a manner to deviate from a predetermined stop position, the operator is not required to perform any special operations, such as measuring and inputting the amount of the deviation. This makes it possible to move the cab from the standby position and dock the cab with the aircraft while eliminating or simplifying operations performed by the operator. Further, at the standby position, from which the cab starts moving at the time of performing the docking of the cab with the entrance, the image of the entrance is captured by the entrance image capturing camera and the target position is calculated. Therefore, even in a case where the aircraft has stopped in a manner to deviate from the predetermined stop position, at the time of moving the cab toward the entrance, the movement of the cab can be directed to the entrance from the begging of the moving. This makes is possible to reduce a moving distance and a moving time of the cab that are required for docking the cab with the entrance.

The target position may be a position of the cab at which the cab is spaced apart forward from the entrance by a predetermined distance. The controller may be configured to: when the cab has reached the target position, calculate a docking position based on the horizontal positional information of the entrance, which is calculated by the entrance position calculator, the docking position being a position at which the cab is docked with the entrance; and move the cab to the docking position, and stop the cab at the docking position.

According to the above configuration, the docking position of the cab is calculated when the cab has moved closer and reached the position that is spaced apart forward from the entrance by the predetermined distance. This makes it possible to precisely and automatically move the cab from the standby position to the docking position.

The controller may be configured to: when the cab has reached the target position, temporarily stop the cab from moving; while the cab is temporarily stopped from moving, calculate the docking position; and then cause the cab to start moving again toward the docking position.

According to the above configuration, the cab is temporarily stopped from moving when calculating the docking position, and thereby the docking position can be calculated more precisely.

The target position may be a position of the cab at which the cab is docked with the entrance, and the controller may be configured to stop the cab from moving when the cab has reached the target position.

According to the above configuration, the cab can be quickly and automatically moved from the standby position to the docking position.

The passenger boarding bridge may further include a lifting/lowering mechanism controlled by the controller and configured to lift and lower the cab. The entrance position calculator may be configured to calculate, based on the image of the entrance, an upward/downward moving amount of the cab for adjusting a height of the cab to a height of the entrance. The controller may be configured to lift and lower the cab based on the upward/downward moving amount of the cab, which is calculated by the entrance position calculator.

The entrance position calculator may be configured to: detect the entrance of the aircraft based on a shape of a corner of a door of the entrance, whose image is captured by the entrance image capturing camera; and detect a boundary point between a curved portion of the corner of the door and a straight portion that is continuous with the corner, and calculate the horizontal positional information of the entrance based on the boundary point.

The above configuration makes it possible to detect the entrance without relying on aircraft type information. Also, according to the above configuration, it is not necessary to add any particular features to the aircraft for the detection of the entrance.

The entrance position calculator may be configured to detect the entrance based on: the shape of the corner of the door, whose image is captured by the entrance image capturing camera; and a shape of a reinforcing plate that is present immediately below the door.

The above configuration makes it possible to detect the entrance without relying on aircraft type information. Also, according to the above configuration, it is not necessary to add any particular features to the aircraft for the detection of the entrance.

The passenger boarding bridge may further include: a front wheel image capturing camera mounted to the cab and configured to capture an image of a front wheel of the aircraft and a vicinity around the front wheel; and an aircraft type determiner configured to determine an aircraft type of the aircraft by comparing the image of the front wheel of the aircraft and the vicinity around the front wheel, the image being captured by the front wheel image capturing camera when the cab is at the standby position, with each of shape patterns of a front wheel of an aircraft and a vicinity around the front wheel, the shape patterns being prestored for respective aircraft types.

According to the above configuration, the passenger boarding bridge is capable of autonomously determining the aircraft type without requiring the operator to input aircraft type information into the passenger boarding bridge or without receiving aircraft type information fed from external equipment. In addition, if the operator inputs the aircraft type information into the passenger boarding bridge, whether or not an input error has been made can be confirmed.

It should be noted that, by utilizing aircraft type information, control can be performed to rotate the cab so as to adjust the orientation of the cab at the target position to a predetermined orientation in accordance with the aircraft type determined by the aircraft type determiner, and also, the precision in entrance detection can be increased.

The passenger boarding bridge may further include a pair of distance sensors that are mounted to right and left sides of the distal end part of the cab, respectively, the distance sensors each being configured to measure a distance from the aircraft. The controller may be configured to rotate the cab, such that measurement values from the pair of respective distance sensors are equalized.

The passenger boarding bridge may further include an aircraft detector configured to detect, when the cab is at the standby position, that the aircraft has arrived and stopped at a predetermined aircraft parking area. The entrance position calculator may be configured to start operating when the aircraft detector has detected that the aircraft has arrived and stopped at the predetermined aircraft parking area.

According to the above configuration, when the aircraft has arrived and stopped at the aircraft parking area, the cab automatically starts moving.

The passenger boarding bridge may further include a notifier mounted to the cab, the notifier being configured to notify a crew member of the aircraft that the docking of the cab with the entrance of the aircraft has been completed. The controller may be configured to cause the notifier to notify that the docking has been completed when the cab has been docked with the entrance.

According to the above configuration, since the crew member of the aircraft is notified by the notifier that the docking has been completed, the crew member thus notified can open the entrance door to enable boarding onto and disembarking from the aircraft.

Advantageous Effects of Invention

The present invention is configured as described above, and has an advantage of being able to provide a passenger boarding bridge that is capable of, even in a case where an aircraft has stopped in a manner to deviate from a predetermined stop position, docking a cab with the aircraft without measuring the amount of the deviation, while making it possible to eliminate or simplify operations performed by an operator.

The above and other objects, features, and advantages of the present invention will more fully be apparent from the following detailed description of a preferred embodiment with accompanying drawings.

DESCRIPTION OF EMBODIMENTS

Figure 1:
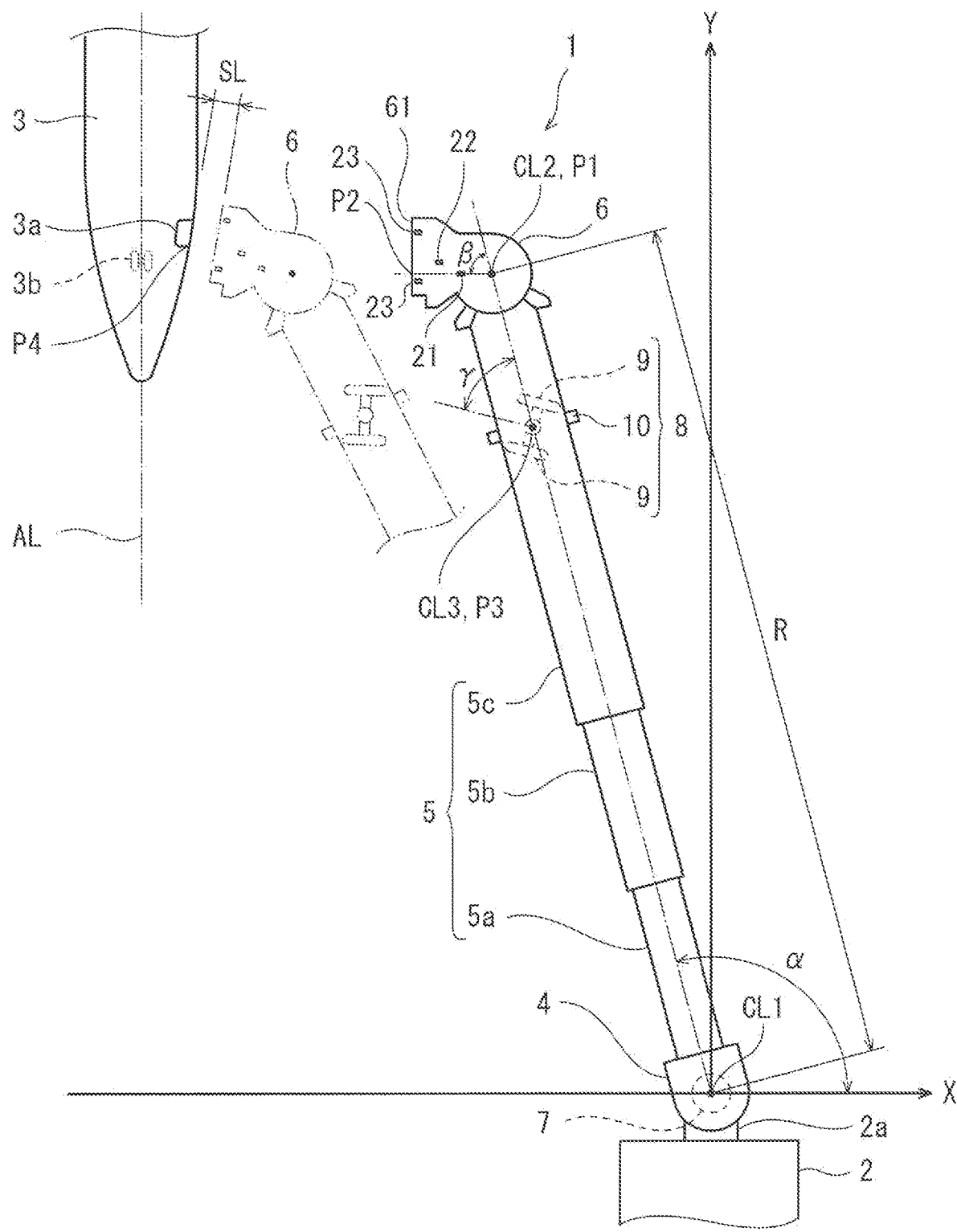
FIG. 1 is a schematic plan view showing one example of a passenger boarding bridge according to an embodiment of the present invention.

Hereinafter, a preferred embodiment of the present invention is described with reference to the drawings. In the drawings, the same or corresponding elements are denoted by the same reference signs, and repeating the same descriptions is avoided below. The present invention is not limited to the embodiment described below.

Embodiment

Figure 2:
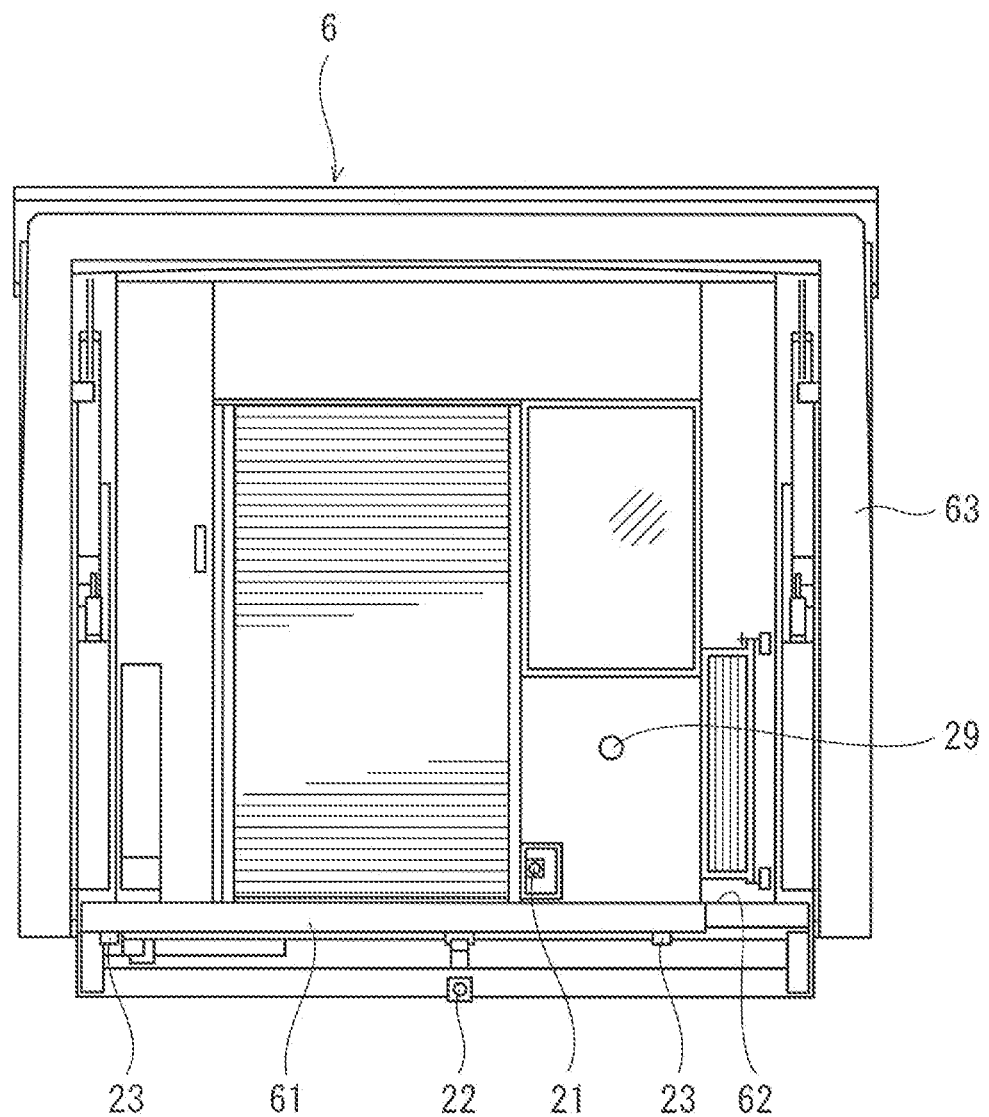
FIG. 2 is a front view of the distal end part of a cab to be docked with an aircraft.
Figure 3:
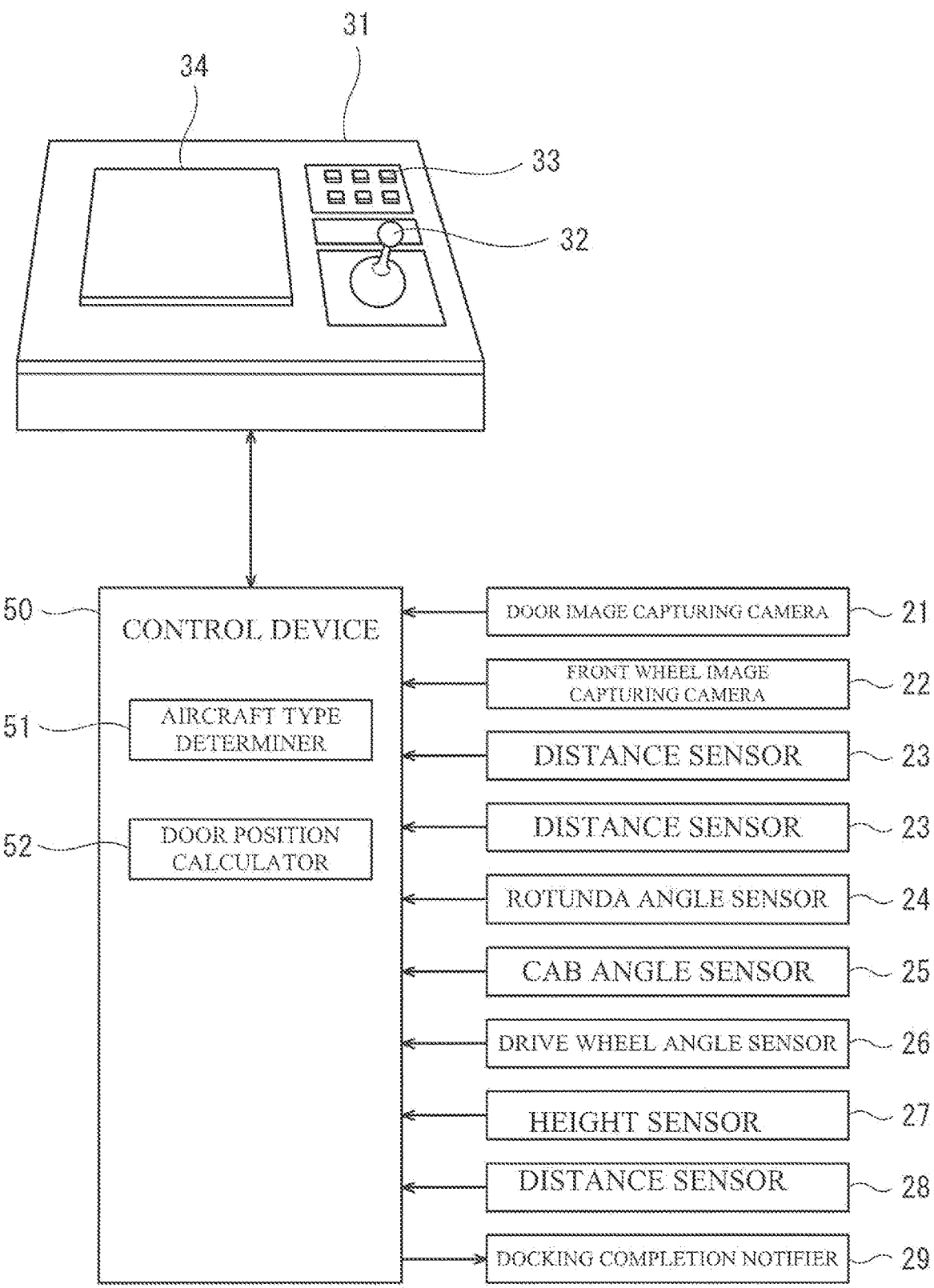
FIG. 3 shows one example of a control board, etc.

FIG. 1 is a schematic plan view showing one example of a passenger boarding bridge according to the present embodiment. FIG. 2 is a front view of the distal end part of a cab to be docked with an aircraft (the front view is taken from the aircraft side). FIG. 3 shows one example of a control board, etc.

The passenger boarding bridge 1 includes: a horizontally rotatable rotunda (proximal-end round room) 4 connected to an entrance 2a of a terminal building 2 of an airport; a tunnel unit 5, whose proximal end is connected to the rotunda 4; and a cab (distal-end round room) 6 provided at the distal end of the tunnel unit 5, such that the cab 6 is rotatable in regular and reverse directions. It should be noted that, for example, auxiliary stairs (not shown) that an operator on the ground uses to get in and out of the cab 6 are set on the side of the tunnel unit 5.

The rotunda 4 is supported by a support pillar 7, such that the rotunda 4 is rotatable in regular and reverse directions about a rotational axis (vertical axis) CL1. The tunnel unit 5 is an extendable/retractable tubular unit forming a connecting passageway that connects between the entrance 2a of the terminal building 2 and a door 3a of an aircraft 3. The tunnel unit 5 includes a plurality of tunnels 5a and 5c, which are fitted together in a telescopic manner (nested manner), such that the entire tunnel unit 5 is extendable and retractable. In the description herein, the tunnel unit 5 is formed by the three tunnels 5a to 5c as one example. The tunnel unit 5 is formed by at least two tunnels.

A distal-side part of the tunnel unit 5 (i.e., the tunnel 5c, which is the frontmost tunnel) is provided with drive columns 8, which serve as support legs. The drive columns 8 are provided with a lifting/lowering mechanism 10 configured to move the cab 6 and the tunnel unit 5 upward/downward. By moving the tunnel unit 5 upward/downward by the lifting/lowering mechanism 10, the cab 6 and the tunnel unit 5 can be swung vertically with respect to the rotunda 4, which serves as a proximal end.

The drive columns 8 are provided with a pair of drive wheels 9 below the lifting/lowering mechanism 10. The drive wheels 9 are configured to be able to run forward and rearward, and rotatable in regular and reverse directions about a rotational axis (vertical axis) CL3, which passes through the center point of the two drive wheels 9, such that the rudder angle is changeable within the range of −90° to +90° relative to the longitudinal direction of the tunnel unit 5. It should be noted that the drive columns 8 may be provided not on the tunnel 5c, but on the cab 6.

The cab 6 is provided at the distal end of the tunnel unit 5. The cab 6 is configured to be rotatable, by means of an unshown rotational mechanism, in regular and reverse directions about a rotational axis CL2, which is perpendicular to the floor surface of the cab 6. Since the cab 6 is thus mounted to the distal end of the tunnel unit 5, the cab 6 can also be swung vertically together with the tunnel unit 5 by the lifting/lowering mechanism 10 of the drive columns 8 with respect to the rotunda 4, which serves as a proximal end.

As shown in FIG. 1 and FIG. 2, a door image capturing camera (entrance image capturing camera) 21 for capturing an image of the door 3a of the aircraft 3 is installed in the distal end part of the cab 6 at a position slightly above the surface of the floor of the distal end part of the cab 6. Also, a front wheel image capturing camera 22 for capturing an image of front wheels 3b of the aircraft 3 is installed at a position below the floor of the distal end part of the cab 6. For example, IP cameras are used as the cameras 21 and 22. In this example, the installation position and the image-capturing direction of each camera are fixed in relation to the cab 6. In addition, a plurality of (in this example, two) distance sensors 23 (e.g., laser distance meters), each of which is configured to detect the distance between the cab 6 and the aircraft 3, are mounted to a bumper 61 provided at the distal end of the floor 62 of the distal end part of the cab 6, such that the distance sensors 23 are arranged in the right-left direction.

As shown in FIG. 2, a bellows portion 63 capable of expanding and contracting in the front-rear direction is provided on the distal end part of the cab 6. FIG. 2 shows a gate-shaped contacting portion provided on the front end of the bellows portion 63. The gate-shaped contacting portion is configured to come into contact with the aircraft 3. Inside the cab 6, a docking completion notifier 29 is provided at such a position that, when the cab 6 is docked with the aircraft 3, a crew member in the aircraft 3 can see the docking completion notifier 29 through the window of the door 3a of the aircraft 3. The docking completion notifier 29 can be configured as, for example, a green indicating lamp. By turning on the lamp, the crew member can be notified of the completion of the docking, and when notified of the completion of the docking, the crew member opens the door 3a of the aircraft 3.

As shown in FIG. 3, the passenger boarding bridge 1 is further provided with: an angle sensor 24 configured to detect a rotation angle $\alpha$ (FIG. 1) of the rotunda 4; an angle sensor 25 configured to detect a rotation angle $\beta$ (FIG. 1) of the cab 6 relative to the tunnel unit 5; an angle sensor 26 configured to detect a rotation angle $\gamma$ (FIG. 1) of the drive wheels 9; a height sensor 27 configured to measure the amount of lifting/lowering of the tunnel unit 5 by the lifting/lowering mechanism 10 and detect the height of the tunnel unit 5; and a distance sensor 28 configured to detect a distance R (FIG. 1) from the center point of the rotunda 4 (i.e., the position of the rotational axis CL1) to the center point of the cab 6 (i.e., the position of the rotational axis CL2). These sensors are arranged at suitable positions, respectively. The distance sensor 28 is configured as, for example, a distance meter that measures the length of the tunnel unit 5. The distance sensor 28 is capable of calculating the distance R from its measurement value, and also capable of calculating the distance from the center point of the rotunda 4 (the position of the rotational axis CL1) to the center point of the pair of drive wheels 9 (the position of the rotational axis CL3).

A control board 31 as shown in FIG. 3 is provided inside the cab 6. The control board 31 is provided with various operation switches 33 for performing, for example, operations of lifting/lowering the tunnel unit 5 and the cab 6 by the lifting/lowering mechanism 10 and rotating the cab 6. The control board 31 is further provided with: an operating lever 32 for operating the drive wheels 9; and a display device 34. The operating lever 32 is configured as a lever-shaped input device (i.e., a joystick) that has degrees of freedom multi-directionally.

A control device 50 and the control board 31 are connected to each other via electrical circuitry. The control device 50 is configured to: receive inputs of, for example, information (operation information) that is based on operations performed on the operation switches 33 and the operating lever 32, image data captured by the cameras 21 and 22, and output signals from the sensors 23 to 28; control the operations of the passenger boarding bridge 1; and output, for example, information to be displayed on the display device 34.

It should be noted that the control device 50 includes an arithmetic processing unit such as a CPU and a storage unit including a ROM, RAM, etc. A control program for operating the passenger boarding bridge 1 and information necessary for the operations of the passenger boarding bridge 1 are prestored in the storage unit. By executing the control program, the arithmetic processing unit functions as a controller that, for example, controls the operations of the components of the passenger boarding bridge 1 (the operations of, for example, rotational mechanisms of the two drive wheels 9, the lifting/lowering mechanism 10, and the cab 6), and also functions as, for example, an aircraft type determiner 51 and a door position calculator (entrance position calculator) 52. It should be noted that information to be stored while the passenger boarding bridge 1 is in operation is also stored in the storage unit. For example, the cab 6 or the frontmost tunnel 5c is provided with the control device 50.

Figure 4:
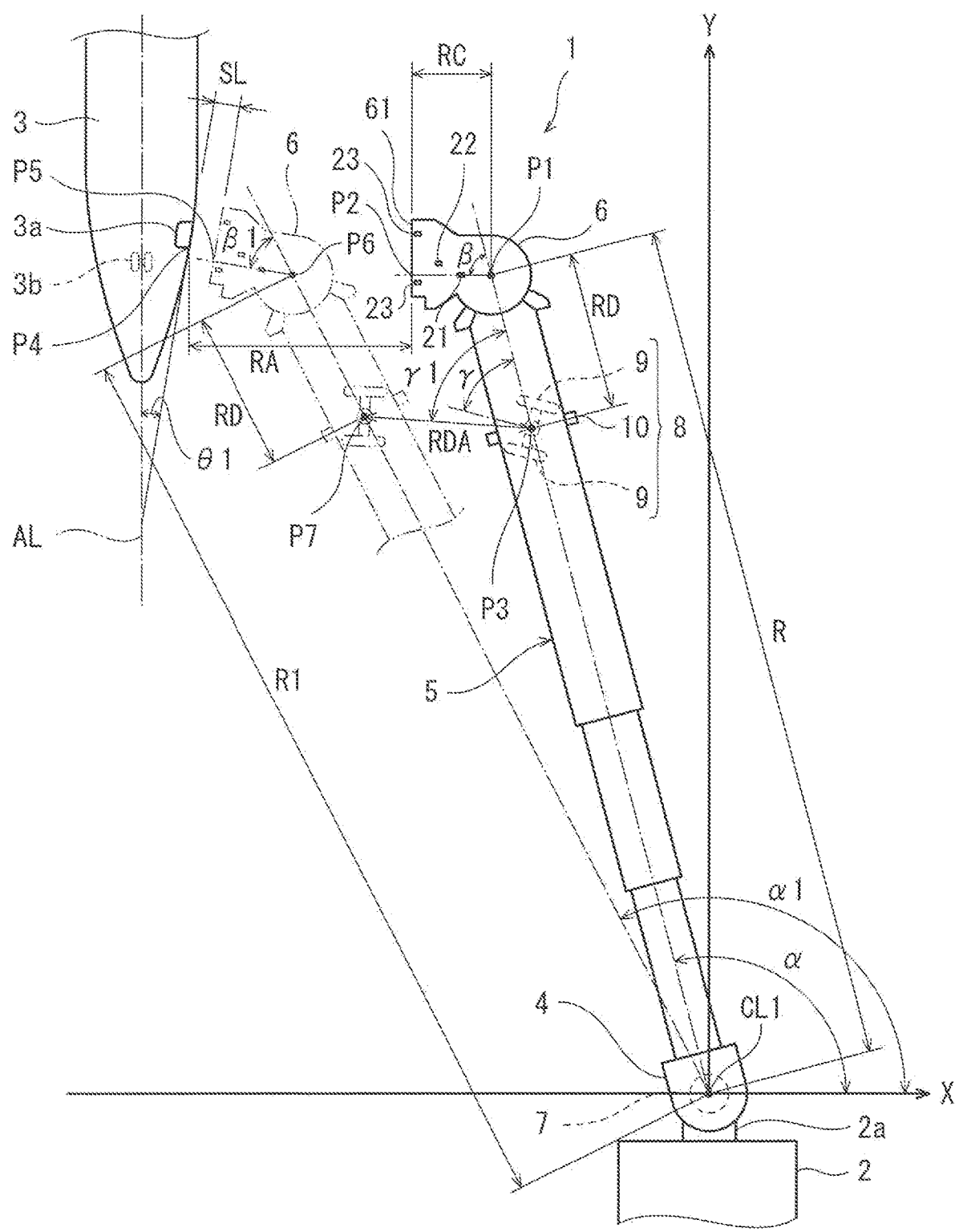
FIG. 4 is a schematic plan view for describing operations of the passenger boarding bridge at the time of docking.
Figure 5:
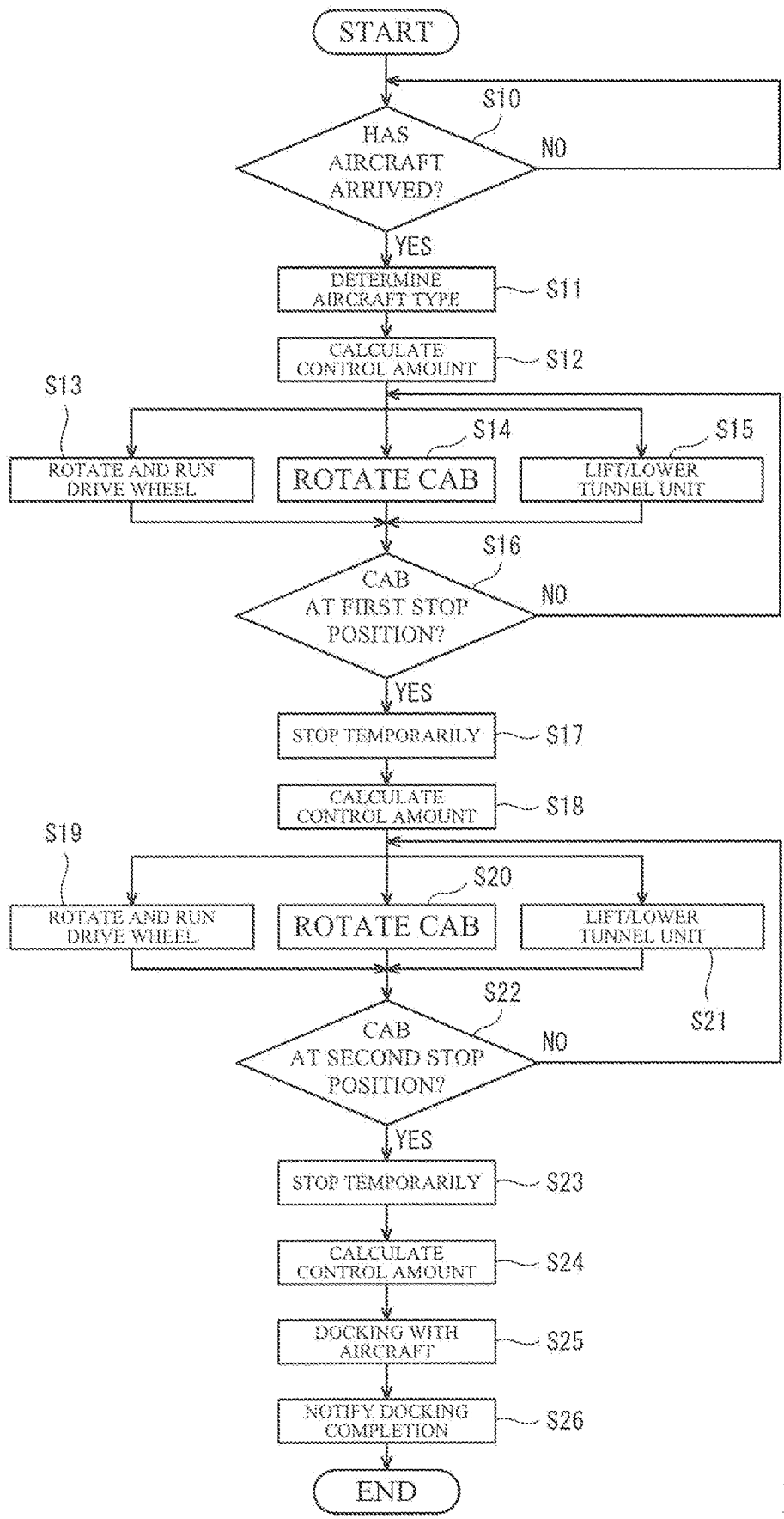
FIG. 5 is a flowchart showing one example of operations of the passenger boarding bridge at the time of docking.

Next, one example of operations of the passenger boarding bridge 1 is described. Operations of the passenger boarding bridge 1 are realized by the control performed by the control device 50. FIG. 4 is a diagram for describing operations of the passenger boarding bridge 1 at the time of docking. FIG. 4 is based on FIG. 1, and is provided with additional reference signs, etc., compared to FIG. 1. FIG. 5 is a flowchart showing one example of operations of the passenger boarding bridge 1 at the time of docking.

When performing control of the passenger boarding bridge 1, the control device 50 uses XY orthogonal coordinates as shown in FIG. 1 and FIG. 4. Specifically, as absolute coordinates, the center point of the rotunda 4 (i.e., the position of the rotational axis CL1) is used as an origin (0, 0), for which an X-axis and a Y-axis are set. Position coordinates of various parts of the passenger boarding bridge 1 are represented in the coordinate system.

After the aircraft 3 has arrived at an apron (a predetermined aircraft parking area) and before the aircraft 3 stops, the passenger boarding bridge 1 stands by at a standby position that is indicated by solid line in FIG. 4. At the standby position, when seen in plan view, the image-capturing direction of each of the cameras 21 and 22 is orthogonal to an aircraft axis line AL, and each of the cameras 21 and 22 captures an image of the aircraft 3 from the side of the aircraft 3. The laser-emitting direction of each of the two distance sensors 23 is also orthogonal to the aircraft axis line AL when seen in plan view. In this example, when the passenger boarding bridge 1 is at the standby position, the orientation (the facing direction) of the cab 6 is controlled such that the distal end part (the bumper 61) of the cab 6 is parallel to the aircraft axis line AL.

The standby position of the cab 6 is a predetermined start position, from which the cab 6 starts moving at the time of performing the docking of the cab 6 with the entrance (the door 3*a*) of the aircraft 3. At the time of performing the docking of the cab 6 with the entrance of the aircraft 3, the cab 6 starts moving from the standby position, and is then docked with the entrance. When the cab 6 is undocked from the entrance, the cab 6 returns to and stops at the standby position, and then the cab 6 stands by at the standby position until the operation of docking the cab 6 with the entrance of the next aircraft starts. Thus, the standby position of the cab 6 is a predetermined start position, from which the cab 6 starts moving at the time of performing the docking of the cab 6 with the entrance of any of a plurality of aircrafts for which the passenger boarding bridge 1 is used (the plurality of aircrafts may be a plurality of different types of aircrafts, or may be a plurality of aircrafts of the same type), but is not a position that the cab 6 passes in the middle of performing the docking of the cab 6 with the entrance.

It should be noted that when the cab 6 is undocked from the aircraft 3, in order for the cab 6 to return to the standby position, the coordinates of a center position P3 (the position of the rotational axis CL3) of the pair of drive wheels 9 at the target standby position are prestored in the control device 50. Also, a distance RC (predetermined value) from a center position P1 to a distal end position P2 of the cab 6, and a distance RD (predetermined value) from the center position P1 of the cab 6 to the center position P3 (the position of the rotational axis CL3) of the pair of drive wheels 9, are prestored in the control device 50.

For example, the center position (P1) of the cab 6 is represented by the position coordinates of the center point of the cab 6 (i.e., the position of the rotational axis CL2). The coordinates of the center position P1 of the cab 6 at the standby position can be calculated, for example, by using: the distance R from the center point of the rotunda 4 to the center point of the cab 6, the distance R being detected by the distance sensor 28; and the rotation angle α of the rotunda 4, which is detected by the angle sensor 24. The coordinates of the distal end position P2 of the cab 6 can be calculated by using: the center position P1 of the cab 6; the distance RC from the center position P1 to the distal end position P2 of the cab 6; and the rotation angle 3 of the cab 6, which is detected by the angle sensor 25. The coordinates of the center position P3 (the position of the rotational axis CL3) of the pair of drive wheels 9 can be calculated by using: a distance (R−RD) from the center point of the rotunda 4 to the center point of the drive wheels 9; and the rotation angle α of the rotunda 4, which is detected by the angle sensor 24.

The passenger boarding bridge 1 indicated by two-dot chain line in FIG. 4 is in such a state that the cab 6 is at a first stop position, and that the distal end position (P5) of the cab 6 is at a position that is spaced apart forward from the door 3*a* of the aircraft 3 by a predetermined distance SL (in this example, SL=1 m).

A regular stop position for the aircraft 3 is a predetermined position, at which the axis of the aircraft 3 is on the aircraft axis line (fuselage guide line) AL, and the regular stop position is set relative to the Y-axis direction. Although the aircraft 3 is stopped targeting the regular stop position, there are cases where an actual stop position of the aircraft 3 deviates from the regular stop position. It should be noted that the aircraft axis line AL is drawn on the apron. FIG. 1 and FIG. 4 show the axis of the aircraft 3 being on the aircraft axis line AL.

Operations of the passenger boarding bridge 1 until it is docked with the aircraft 3 are entirely automatically performed based on the control performed by the control device 50. This automatic control is performed as described below. It should be noted that, in the description below, the X coordinate and the Y coordinate of a position Pn (n is an integer) are referred to as Xn and Yn, respectively. An X coordinate value and a Y coordinate value each indicate a distance from the origin (0, 0), which is the position of the rotational axis CL1 of the rotunda 4 (e.g., in units of [mm]). In the description herein, X coordinate values on the right side of the origin (0, 0) are positive values, and X coordinate values on the left side of the origin (0, 0) are negative values.

As shown in FIG. 5, first, the control device 50 determines in step S10 whether or not the aircraft 3 has arrived. This determination is performed based on measurement values from the two distance sensors 23. When the aircraft 3 has not arrived yet, no measurement values are obtained from the two distance sensors 23. On the other hand, when the aircraft 3 arrives and stops, the measurement values from the two distance sensors 23 become stable and constant. Therefore, when the measurement values from the two distance sensors 23 have become stable and constant, the control device 50 determines that the aircraft 3 has arrived (i.e., arrived and stopped). At the time, the control device 50 and the two distance sensors 23 function as an aircraft detector. FIG. 1 and FIG. 4 each show a state where the aircraft 3 has arrived and stopped.

Next, in step S11, the control device 50 determines the aircraft type of the aircraft 3 based on, for example, an image captured by the front wheel image capturing camera 22. The determination is performed by a method that is described below in detail.

Figure 7:
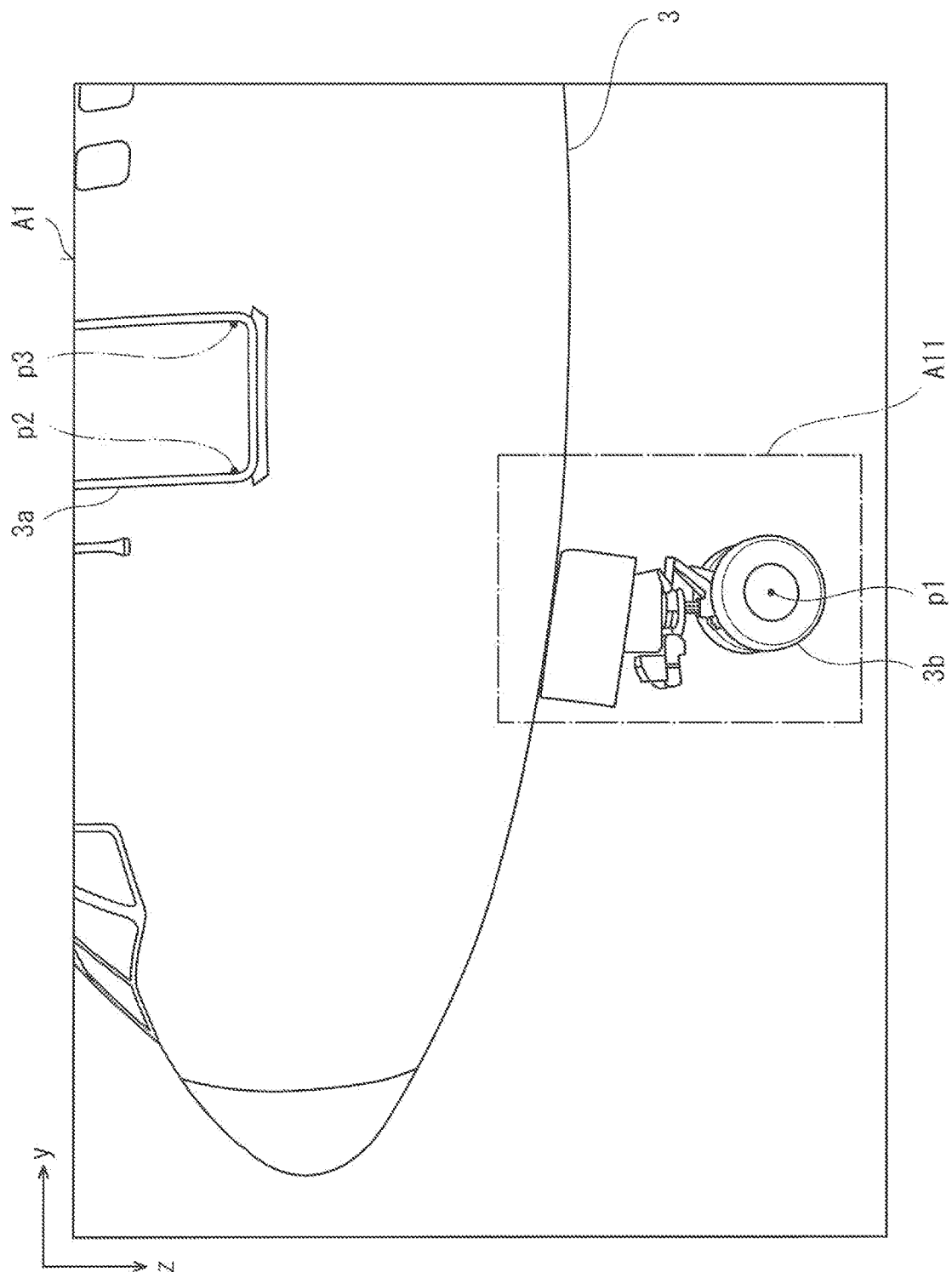
FIG. 7 is a schematic diagram showing one example of an image captured by a front wheel image capturing camera when the cab is at a standby position.

FIG. 7 is a schematic diagram showing one example of an image A1 captured by the front wheel image capturing camera 22 when the cab 6 is at the standby position. Generally speaking, the mechanical structure in the vicinity of the front wheels (i.e., suspension structure) is different between each type of aircraft. In this example, the aircraft type is determined by using the shape of the mechanical structure in the vicinity of the front wheels of the aircraft as seen from the standby position of the cab 6. Accordingly, the storage unit of the control device 50 prestores therein, for each of a plurality of aircraft types, a shape pattern of the front wheels and the mechanical structure in the vicinity thereof as seen from the side (hereinafter, "front wheel part shape pattern").

The aircraft type determiner 51 (FIG. 3) of the control device 50, for example, compares an image A11 captured by the front wheel image capturing camera 22, the image A11 being an image of a region including the front wheels 3*b* and the mechanical structure in the vicinity thereof, with the aforementioned plurality of front wheel part shape patterns, and selects the closest one of the front wheel part shape patterns to the image A11, thereby determining the aircraft type of the aircraft 3.

Figure 6:
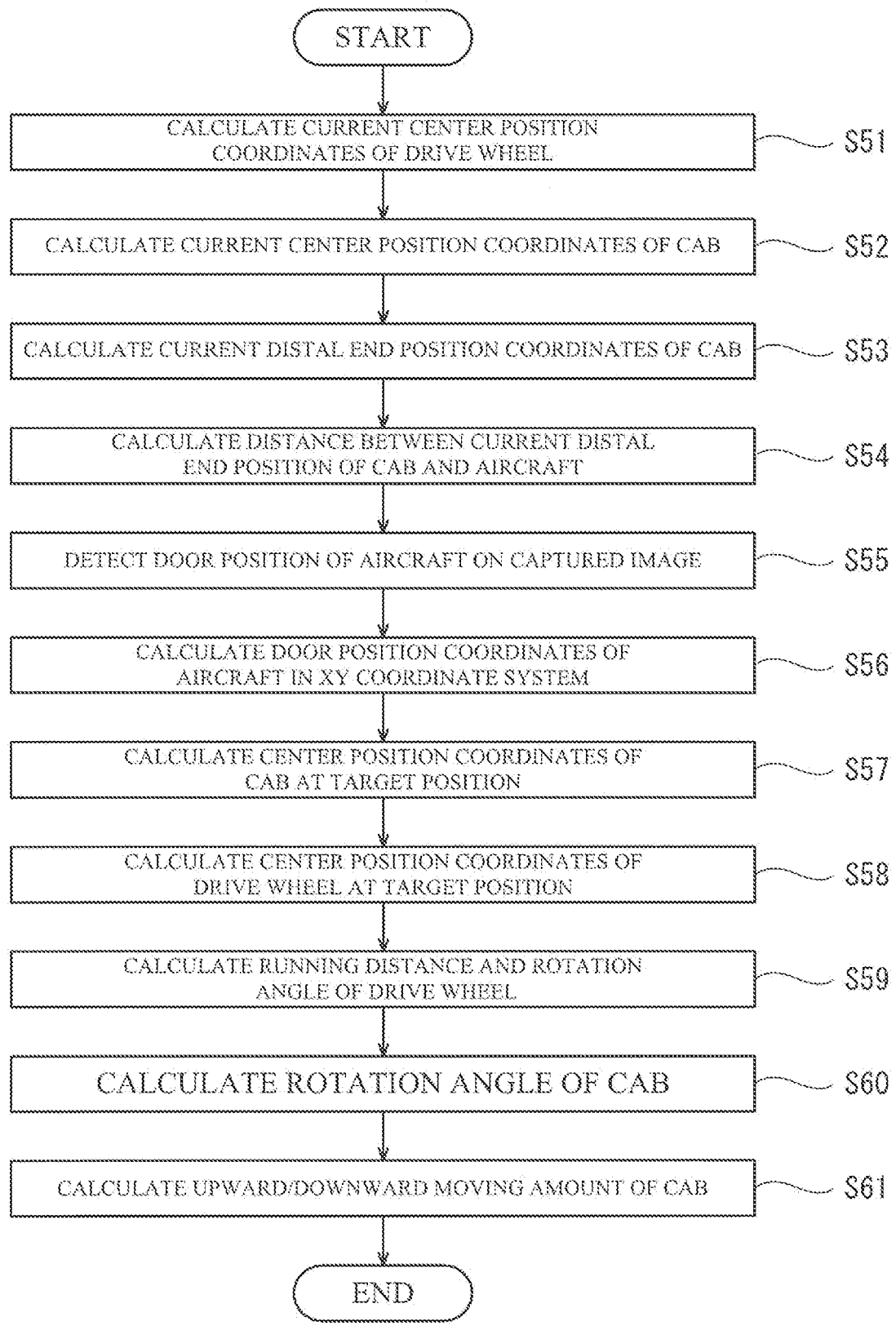
FIG. 6 is a flowchart showing one example of a method of calculating control amounts for operations of the passenger boarding bridge at the time of docking.

Next, in step S12, the control device 50 calculates control amounts for moving the cab 6 to a target position. A specific example case is described below in (1) to (3). FIG. 6 shows one example of a flowchart in this case. The order of the steps shown in FIG. 6 is not limited to the order indicated in FIG. 6. The target position herein is the position indicated by two-dot chain line, and is the position (first stop position), at which the bumper 61 of the distal end part of the cab 6 is in such an orientation as to face the door 3*a* of the aircraft 3 and is spaced apart forward from the door 3*a* by the predetermined distance SL (e.g., 1 m).

(1) Calculation of a Running Distance and a Rotation Angle of the Drive Wheels 9 (Steps S51 to S59 of FIG. 6).

Here, a running distance and a rotation angle (a running direction) of the drive wheels 9 for moving the center position of the cab 6 from the current position P1 (X1, Y1) at the standby position to a target position P6 (X6, Y6) are calculated.

In step S51, when the cab 6 is at the standby position, the control device 50 calculates the current center position P3 (X3, Y3) of the drive wheels 9 by using formulas shown below. It should be noted that the distance R is a value based on the distance sensor 28 when the cab 6 is at the standby position, and the rotation angle α is a value based on the rotunda angle sensor 24 when the cab 6 is at the standby position.

$$X3=(R-RD)\times\cos \alpha$$

$$Y3=(R-RD)\times\sin \alpha$$

Next, steps S52 to S56 are performed for calculating a position P4 (X4, Y4) of the door 3*a* of the aircraft 3. It should be noted that (X4, Y4) is horizontal positional information of the entrance.

First, in step S52, the current center position P1 (X1, Y1) of the cab 6 is calculated by using formulas shown below.

$$X1=R\times\cos \alpha$$

$$Y1=R\times\sin \alpha$$

Next, in step S53, the current distal end position P2 (X2, Y2) of the cab 6 is calculated by using formulas shown below. It should be noted that the rotation angle 3 is a current value based on the cab angle sensor 25.

$$X2=X1-RC\times\cos(180-\alpha-\beta)$$

$$Y2=Y1+RC\times\sin(180-\alpha-\beta)$$

Next, in step S54, a distance RA from the current distal end position P2 of the cab 6 to the aircraft 3 is determined. Between the measurement values from the two respective distance sensors 23, for example, the measurement value indicating a shorter distance is used as the distance RA.

Next, in steps S55 and S56, the control device 50 detects the door 3*a* of the aircraft 3 based on an image captured by the door image capturing camera 21, and calculates the position P4 (X4, Y4) of the door 3*a*.

Figure 8:
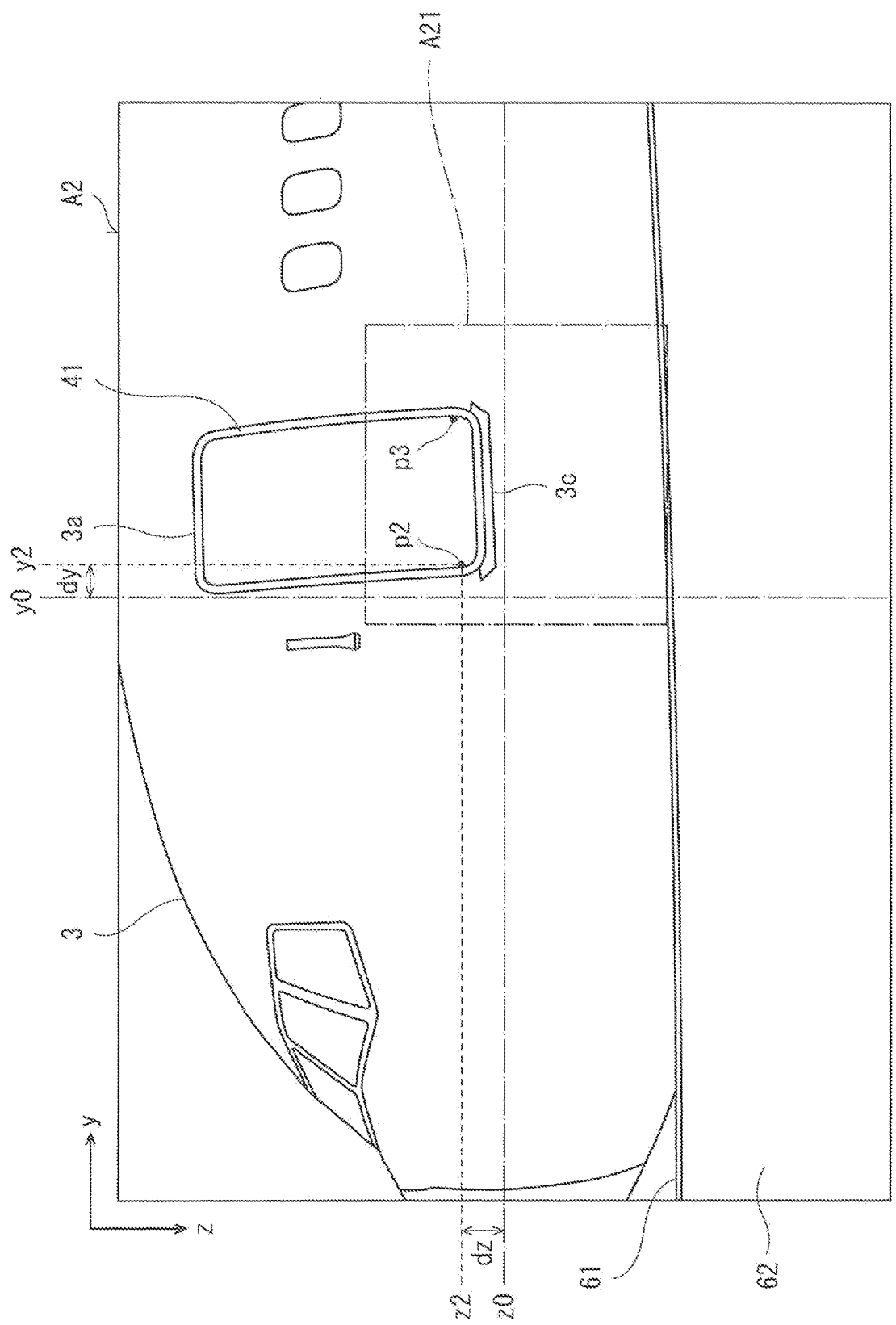
FIG. 8 is a schematic diagram showing one example of an image captured by a door image capturing camera when the cab is at the standby position.

A detailed description is given in this respect. FIG. 8 is a schematic diagram showing one example of an image A2 captured by the door image capturing camera 21 when the cab 6 is at the standby position.

In general, each type of aircraft is different in terms of the shape (curvature) of the four corners (curved portions) of the door. In this example, the door is detected by using the shape of the two lower corners among the four corners of the door. The storage unit of the control device 50 prestores therein, for each of the plurality of aircraft types, a shape pattern of the entrance, for example, a shape pattern of the lower two corners of the door (hereinafter, "door part shape pattern").

The door position calculator 52 (FIG. 3) of the control device 50, for example, compares an image captured by the door image capturing camera 21 with the stored door part shape patterns, thereby detecting the door 3*a* within a region A21, and detects right and left reference points p2 and p3 as the position of the door 3*a*. It should be noted that the comparison with the stored door part shape patterns is not essential, so long as the door 3*a* can be detected based on the shape of the lower two corners among the four corners of the door 3*a* by using, for example, image recognition technology. Thus, the entrance (the door 3*a*) can be detected without relying on information that is specific to the aircraft type. However, by additionally using information specific to the aircraft type as in this example, the precision and speed of the detection of the entrance can be increased.

The reference points p2 and p3 are boundary points between curved portions of lower right and left corners of a painted portion 41 of the door 3*a* and straight portions extending upward from the corners. In general, the contour portion of the door 3*a* of the aircraft 3 is painted so that the door 3*a* can be visually recognized. In this example, the door 3*a* and the reference points p2 and p3 thereof are detected based on the shape of the painted portion 41.

In step S55, the control device 50 detects the door 3*a*, and also detects the reference points p2 and p3 as the position of the door 3*a*, as described above, and determines the position of one of the reference points p2 and p3, specifically the position of the left-side reference point p2 in this example, in the form of yz coordinates (y2, z2). It should be noted that the control device 50 defines a yz orthogonal coordinate system by setting a predetermined position (e.g., the upper left corner) of the captured image A2 as an origin (0, 0). The y coordinate value and the z coordinate value of any point on the captured image A2 are represented by a pixel value counted from the origin (0, 0).

In the captured image A2, a y coordinate reference value y0 (predetermined value) of the reference point p2 of the door is set. The y coordinate reference value y0 is the y coordinate value of the reference point p2 when it is not necessary to move the cab 6 in the Y-axis direction in FIG. 4 (i.e., when a required moving amount of the cab 6 in the Y-axis direction is 0) at the time of moving the cab 6 to the target position.

In step S56, the control device 50 calculates, based on a predetermined calculation formula (A), a value that is obtained by converting a difference dy between the y coordinate value y2 and the reference value y0 of the reference point p2 (=y2−y0) into an actual distance dY in the Y-axis direction. The calculation formula (A) is a formula for calculating the distance dY by using, as parameters, the distance (RA) from the current distal end position P2 of the cab 6 to the aircraft 3 and the y coordinate value (y2) of the reference point p2.

Further, in step S56, the control device 50 calculates the position P4 (X4, Y4) of the door 3*a* of the aircraft 3 by using formulas shown below.

$$X4=X2-RA$$

$$Y4=Y2+dY$$

Next, in step S57, based on the position P4 (X4, Y4) of the door 3*a* of the aircraft 3, the control device 50 calculates the center position P6 (X6, Y6) of the cab 6, which is the center position of the cab 6 when the cab 6 is at the target position. Here, the distal end position P5 (X5, Y5) of the cab 6 when the cab 6 is at the target position, at which the distal end position P5 (X5, Y5) is spaced apart forward from the aircraft 3 by 1 m (SL), is as shown below.

$$X5=X4+SL \text{ (where } SL=1000 \text{ [mm])}$$

$$Y5=Y4$$

Then, the center position P6 (X6, Y6) of the cab 6 is calculated as shown below.

$$X6=X5+RC=X4+SL+RC$$

$$Y6=Y5=Y4$$

Next, in step S58, the control device 50 calculates a center position P7 (X7, Y7) of the drive wheels 9, which is the center position of the drive wheels 9 when the cab 6 is at the target position, by using formulas shown below.

$$X7 = (R1-RD) \times \cos \alpha 1$$

$$Y7 = (R1-RD) \times \sin \alpha 1$$

Here, the distance from the center point of the rotunda 4 to the center point of the cab 6 when the cab 6 is at the target position is R1, and the rotation angle of the rotunda 4 when the cab 6 is at the target position is α1.

In the above calculation formulas for calculating X7 and Y7, $$R1 = \{(X6)^2 + (Y6)^2\}^{1/2}$$

$$\cos \alpha 1 = X6/R1$$

$$\sin \alpha 1 = Y6/R1$$

Next, in step S59, the control device 50 calculates a running distance RDA and a rotation angle γ1 of the drive wheels 9, which are the running distance and the rotation angle of the drive wheels 9 when the cab 6 moves from the current position to the target position, by using formulas shown below.

$$RDA = \{(X3-X7)^2 + (Y3-Y7)^2\}^{1/2}$$

$$\gamma 1 = 180 - \alpha - \arccos\{(X3-X7)/RDA\}$$

The running distance RDA and the rotation angle γ1 of the drive wheels 9 can be calculated as described above. If the rotation angle of the drive wheels 9 at the current position is γ, then in the following step S13, the drive wheels 9 are rotated by a difference between γ1 and γ.

(2) Calculation of Rotation Angle of Cab 6 (Step S60 of FIG. 6)

Next, in step S60, the control device 50 calculates a rotation angle β1 of the cab 6, the rotation angle β1 determining the orientation (i.e., facing direction) of the cab 6 when the cab 6 is at the target position. The control device 50 stores therein, for each of the aircraft types, an angle in plan view, the angle being formed by: the axis of the aircraft; and a tangent line on a fuselage portion of the entrance with which the cab 6 is to be docked (hereinafter, "fuselage angle"). Accordingly, the control device 50 selects, from among the stored fuselage angles, the fuselage angle that corresponds to the aircraft type determined in step S11 of FIG. 5. Assuming that the selected fuselage angle is θ1 (see FIG. 4), the rotation angle β1 is determined by using a formula shown below.

$$\beta 1 = 180 - \alpha 1 - \theta 1$$

Here, α1=arccos(X6/R1), where 90<α1<180

If the rotation angle of the cab 6 at the current position is 0, then in the following step S14, the cab 6 is rotated by a difference between β1 and β. In this case, in step S14, the cab 6 is rotated so that the orientation (i.e., facing direction) of the cab 6 at the target position will be a predetermined orientation corresponding to the aircraft type of the aircraft 3.

(3) Calculation of Upward/Downward Moving Amount of the Cab 6 (Step S61 of FIG. 6)

Next, in step S61, the control device 50 calculates an upward/downward moving amount by which the tunnel unit 5 is moved upward/downward by the lifting/lowering mechanism 10 when the cab 6 moves from the current position to the target position, i.e., calculates an upward/downward moving amount of the cab 6 for adjusting the height of the cab 6 to the height of the door 3a.

In the above-described step S56, the y coordinate value y2 of the reference point p2 of the door 3a in the captured image A2 of FIG. 8 is used. On the other hand, in this calculation, the z coordinate value z2 of the reference point p2 is used.

In the captured image A2 of FIG. 8, a z coordinate reference value z0 (predetermined value) of the reference point p2 of the door is set. The z coordinate reference value z0 is the z coordinate value of the reference point p2 when it is not necessary to move the cab 6 in the height direction (i.e., when a required upward/downward moving amount of the cab 6 is 0) at the time of moving the cab 6 to the target position.

In step S61, the control device 50 calculates, based on a predetermined calculation formula (B), a value that is obtained by converting a difference dz between the z coordinate value z2 and the reference value z0 of the reference point p2 (=z2−z0) into an actual distance dZ in the height direction. The calculation formula (B) is a formula for calculating the distance dZ by using, as parameters, the distance (RA) from the current distal end position P2 of the cab 6 to the aircraft 3 and the z coordinate value (z2) of the reference point p2. The above converted distance dZ is the upward/downward moving amount of the cab 6.

After calculating the control amounts as described above, the control device 50 performs steps S13 to S15.

In step S13, the control device 50 reversely rotates the two drive wheels 9, such that the rotation angle of the drive wheels 9 becomes "γ1", thereby correcting the facing direction of the drive wheels 9, and thereafter, causes the two drive wheels 9 to start running. In step S14, the control device 50 rotates the cab 6, such that the rotation angle of the cab 6 becomes "β1". In step S15, the control device 50 operates the lifting/lowering mechanism 10, such that the cab 6 moves upward/downward by the distance "dZ".

In step S16, the control device 50 determines whether or not the cab 6 has reached the first stop position (which is, in this example, a position that is spaced apart forward from the door 3a by 1 m). If it is determined that the cab 6 has reached the first stop position, the control device 50 temporarily stops the two drive wheels 9 from running (step S17). From the start of the running of the drive wheels 9, the control device 50 always keeps calculating the running distance, and when the running distance reaches "RDA", determines that the cab 6 has reached the first stop position, and stops the drive wheels 9 from running.

During the above running of the drive wheels 9, i.e., while the center position of the drive wheels 9 is moving from P3 to P7, the control device 50 may always keep calculating the center position of the drive wheels 9 based on the measurement values from the rotunda angle sensor 24 and the distance sensor 28, and control the rotational speed (running speed) of each of the two drive wheels 9 such that the drive wheels 9 run toward the target center position P7. Further, during the above running, the control device 50 may monitor the image captured by the door image capturing camera 21, and if, for example, the door 3a can no longer be detected from the captured image (i.e., the door 3a stops being shown in the captured image), the control device 50 may determine that malfunctioning, such as some kind of mechanical failure, has occurred, and stop the automatic control to stop the passenger boarding bridge 1 from moving. Thereafter, the operator manually operates the passenger boarding bridge 1.

Next, in step S18, the control device 50 calculates control amounts for moving the cab 6 to a docking position at which the cab 6 is docked with the door 3a of the aircraft 3. The calculation of the control amounts can be performed in the same manner as in step S12. However, in step S18, since the calculation is performed assuming that the target position of the cab 6 is the docking position, the distance SL between the distal end position of the cab 6 and the door 3a of the aircraft 3 is SL=0. It should be noted that the door 3a in an image captured by the door image capturing camera 21 when the cab 6 is at the first stop position is shown larger than the door 3a in the image of FIG. 8, which is captured by the door image capturing camera 21 when the cab 6 is at the standby position.

Then, based on the control amounts calculated in step S18, the control device 50 performs steps S19 to S21. It is assumed here that, in step S18, "γ2" is determined as the rotation angle of the drive wheels 9; "RDA2" is determined as the running distance of the drive wheels 9; "β2" is determined as the rotation angle of the cab 6; and "dZ2" is determined as the upward/downward moving amount of the cab 6.

In step S19, the control device 50 reversely rotates the two drive wheels 9, such that the rotation angle of the drive wheels 9 becomes "γ2", thereby correcting the facing direction of the drive wheels 9, and thereafter, causes the two drive wheels 9 to start running. In step S20, the control device 50 rotates the cab 6, such that the rotation angle of the cab 6 becomes "β2". In step S21, the control device 50 operates the lifting/lowering mechanism 10, such that the cab 6 moves upward/downward by the distance "dZ2".

After causing the two drive wheels 9 to start running in the above step S19, the control device 50 lowers the running speed when the distance between the cab 6 and the aircraft 3, the distance being detected by the distance sensors 23, has become a predetermined distance (e.g., 0.3 m) or less.

Next, in step S22, the control device 50 determines whether or not the cab 6 has reached a second stop position (which is, in this example, a position that is spaced apart forward from the door 3a by 0.1 m). If it is determined that the cab 6 has reached the second stop position, the control device 50 temporarily stops the two drive wheels 9 from running (step S23). In this case, after causing the drive wheels 9 to start running from the first stop position, the control device 50 measures the distance between the aircraft 3 and the distal end of the cab 6 based on the measurement values from the two distance sensors 23, and when the measured distance has become the predetermined distance (e.g., 0.3 m) or less, lowers the running speed. Then, when the measured distance has become 0.1 m, the control device 50 determines that the cab 6 has reached the second stop position, and stops the drive wheels 9 from running. Between the measurement values from the two respective distance sensors 23, for example, the measurement value indicating a shorter distance is adopted as the measured distance.

Next, in step S24, the control device 50 rotates the cab 6 so as to equalize the measurement values from the two respective distance sensors 23, and thereafter, calculates control amounts for performing fine adjustments of, for example, the position of the cab 6. Here, for example, similar to step S61, a distance "dZ3" is calculated as the upward/downward moving amount of the cab 6 based on an image captured by the door image capturing camera 21.

Next, in step S25, the control device 50 causes the drive wheels 9 to start running again at a slow speed, and when either one of the measurement values from the two respective distance sensors 23 has become 0, stops the drive wheels 9 from running. Subsequently, the control device 50 operates the bellows portion 63, such that the bellows portion 63 expands forward to come into contact with the aircraft 3, thereby docking the cab 6 with the aircraft 3. Here, when having stopped the drive wheels 9 from running, the control device 50 may confirm that the difference between the z coordinate value of the reference point of the door 3a on the image captured by the door image capturing camera 21 and the z coordinate reference value (i.e., the value corresponding to dz in FIG. 8) is 0 or within an allowable range, and thereafter operate the bellows portion 63 to bring the bellows portion 63 into contact with the aircraft 3.

Finally, in step S26, the control device 50 controls the docking completion notifier 29 to notify a crew member of the aircraft 3 that the docking of the cab 6 (i.e., the docking of the passenger boarding bridge 1) has been completed.

It should be noted that in order to bring the cab 6 back to the standby position, for example, the operator may push a return button of the control board 31 (one of the operation switches 33), the return button being configured as a dead man's switch. In this manner, the control device 50 can be caused to start performing automatic control for bringing the cab 6 back to the predetermined standby position.

In the above, the cab 6 may be mounted with a GPS receiver for detecting the center position of the cab 6. At each of the standby position and the first stop position, the control device 50 may calculate a discrepancy between the center position of the cab 6 detected by the GPS receiver and the center position of the cab 6 calculated based on the measurement values from the distance sensor 28 and the angle sensor 24. If the discrepancy exceeds an allowable range, the control device 50 may determine that an abnormality has occurred and stop the automatic control.

In step S10, whether or not the aircraft has arrived is determined based on the measurement values from the two distance sensors 23. However, as an alternative, when the door 3a of the aircraft 3 is detected based on the image captured by the door image capturing camera 21, it may be determined that the aircraft 3 has arrived. When the aircraft 3 has arrived, the operator may push a start button of the control board 31 (one of the operation switches 33) to input a start signal to the control device 50, and in response thereto, the control device 50 may start the automatic control from step S11.

The aircraft 3 is provided with a reinforcing plate 3c immediately below the door 3a. Accordingly, at the time of detecting the door 3a of the aircraft 3 based on the image captured by the door image capturing camera 21, the door 3a may be detected based on the shape of the corners of the door 3a and the shape of the reinforcing plate 3c. That is, the door 3a may be recognized together with the presence of the reinforcing plate 3c. This makes it possible to detect the door 3a more precisely without relying on information specific to the aircraft type.

In the above description, in the process of moving from the standby position to the docking position, the cab 6 makes a temporary stop twice at the first and second stop positions. However, as an alternative, only one of the first and second stop positions may be set, and the cab 6 may make the temporary stop only once at the set stop position, or may continuously move from the standby position to the docking position without making any temporary stops. In either case, it is preferable to lower the running speed of the drive wheels 9 as the cab 6 gets closer to the docking position.

In a case where the first stop position is not set, in step S12, which is performed when the cab 6 is at the standby position, the control amounts may be calculated while setting the docking position as the target position (SL=0).

Further, at a position corresponding to the first stop position, the speed may be lowered and the control amounts may be recalculated. In this manner, the docking precision may be increased. In a case where the second stop position is not set, the calculation of the control amounts (step S18) may be performed when the cab 6 has become close to the docking position and is running at a low speed.

In the present embodiment, the cab 6 is configured to automatically move from the standby position to the docking position in accordance with the control by the control device 50. Therefore, no operation by the operator is required. Even in a case where the control device 50 starts the automatic control from step S11 in response to the operator pushing the start button of the control board 31 when the aircraft 3 has arrived, the operator is only required to perform the simple operation of pushing the start button, and by performing such a simple operation, the cab 6 can be moved from the standby position and docked with the aircraft 3.

Further, in the present embodiment, at the standby position, from which the cab 6 starts moving at the time of performing the docking of the cab 6 with the door 3a, an image of the door 3a is captured by the door image capturing camera 21 and the target position is calculated. Therefore, even in a case where the aircraft 3 has stopped in a manner to deviate from a predetermined stop position, at the time of moving the cab 6 toward the door 3a, the movement of the cab 6 can be directed to the door 3a from the beginning of the moving. This makes it possible to reduce a moving distance and a moving time of the cab 6 that are required for docking the cab 6 with the door 3a. In addition, even in a case where the aircraft 3 has stopped in a manner to deviate from the predetermined stop position, the operator is not required to perform any special operations, such as measuring and inputting the amount of the deviation.

In the present embodiment, the cab 6 is configured to automatically move from the standby position to the docking position. However, as an alternative, part or the entirety of the movement of the cab 6 can be caused by manual operations by the operator. For example, after the cab 6 has automatically moved from the standby position to the first stop position, the movement of the cab 6 from the first stop position to the docking position may be caused by a manual operation by the operator using a dead man's switch. Thus, the movement of the cab 6 from the first stop position to the docking position can be caused by a simple operation.

The distance between the cab 6 and the aircraft 3 is detected by the distance sensors 23 at, for example, the standby position and the first stop position of the cab 6. However, as an alternative, the distance (actual distance) between the cab 6 and the aircraft 3 may be calculated by using the yz coordinates of each of the two reference points (p2, p3) of the door 3a on the image captured by the door image capturing camera 21. In this case, for example, the control device 50 may prestore therein, for each of the aircraft types of the aircraft 3, an actual distance (actual length) between the two reference points p2 and p3 of the door 3a. Then, a distance between the two reference points p2 and p3 of the door 3a on the captured image, the distance being based on the yz coordinates, and the actual distance between the reference points p2 and p3 of the corresponding aircraft type, may be substituted into a predetermined calculation formula, and thereby the distance between the cab 6 and the aircraft 3 may be calculated.

At the standby position of the cab 6, the front wheel part image A11 of the region including the front wheels 3b and the mechanical structure in the vicinity thereof, the image A11 being captured by the front wheel image capturing camera 22, is compared with the aforementioned plurality of front wheel part shape patterns, and thereby the closest front wheel part shape pattern to the image A11 is selected to determine the aircraft type of the aircraft 3. However, there may be a case where a plurality of types of aircrafts having similar front wheel part shape patterns to each other use the airport where the passenger boarding bridge 1 is installed. In this case, a center position p1 of the front wheels 3b is calculated based on an image captured by the front wheel image capturing camera 22. Then, a distance a between a reference point of the door 3a (e.g., the reference point p2) on the image and the center position p1 of the front wheels 3b is calculated. The distance a on the image may be a distance in the Y-axis direction, a distance in the Z-axis direction, or a linear distance. The control device 50 prestores therein, for each of the aircraft types, an actual distance (length) corresponding to the distance a on the image. In this case, the control device 50 may determine, as the aircraft type of the aircraft 3, one aircraft type that is common between the aircraft type (or aircraft types) of the aircraft 3 determined by using the front wheel part image A11 and the aircraft type (or aircraft types) of the aircraft 3 determined by using the distance a on the image. At the time, for example, after the possible aircraft type of the aircraft 3 is narrowed down to several aircraft types by using the front wheel part image A11, the distance a on the image may be converted into an actual distance based on the distance detected by the distance sensors 23, and the converted distance may be compared with each of the actual distances stored for the several respective aircraft types. In this manner, the aircraft type of the aircraft 3 may be determined.

In the present embodiment, in steps S12 and S18, the rotation angle of the cab 6 is calculated as described in step S60. However, as an alternative, without calculating the rotation angle of the cab 6, the control device 50 may rotate the cab 6 in steps S14 and S20, such that the measurement values from the two respective distance sensors 23 are equalized. In this case, it is not necessary to determine the aircraft type of the aircraft 3, and the process in step S11 can be eliminated. The front wheel image capturing camera 22 can also be eliminated.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

INDUSTRIAL APPLICABILITY

The present invention is useful as, for example, a passenger boarding bridge that is capable of, even in a case where an aircraft has stopped in a manner to deviate from a predetermined stop position, docking a cab with the aircraft without measuring the amount of the deviation, while making it possible to eliminate or simplify operations performed by an operator.

REFERENCE CHARACTERS LIST 1 passenger boarding bridge
3 aircraft
3a entrance door
3b front wheel 3c reinforcing plate
5 tunnel unit
6 cab
9 drive wheel
10 lifting/lowering mechanism
21 door image capturing camera
22 front wheel image capturing camera
23 distance sensor
29 docking completion notifier
50 control device
51 aircraft type determiner
52 door position calculator

The invention claimed is:

1. A passenger boarding bridge comprising:
a tunnel unit including a walkway;
a cab rotatably provided on a distal end of the tunnel unit;
a drive wheel provided on the tunnel unit or the cab;
a rotational mechanism configured to rotate the cab;
a controller configured to control the drive wheel to move the cab, control the rotational mechanism to rotate the cab such that the cab is in an orientation in which a distal end part of the cab faces an entrance of an aircraft, and cause the distal end part of the cab to be docked with the entrance;
an entrance image capturing camera mounted to the cab and configured to capture an image of the entrance of the aircraft; and
an entrance position calculator configured to detect the entrance of the aircraft based on the image of the entrance, which is captured by the entrance image capturing camera, and calculate horizontal positional information of the entrance, wherein
the controller is, when the cab is at a predetermined standby position from which the cab starts moving at a time of performing docking of the cab with the entrance, configured to:
calculate a target position based on the horizontal positional information of the entrance, which is calculated by the entrance position calculator, the target position being a destination position to which the cab is moved for docking the cab with the entrance;
move the cab from the standby position to the target position; and
stop the passenger boarding bridge from moving when the entrance can no longer be detected from the captured image.

2. The passenger boarding bridge according to claim 1, wherein
the target position is a position of the cab at which the cab is spaced apart forward from the entrance by a predetermined distance, and
the controller is configured to:
when the cab has reached the target position, calculate a docking position based on the horizontal positional information of the entrance, which is calculated by the entrance position calculator, the docking position being a position at which the cab is docked with the entrance; and
move the cab to the docking position, and stop the cab at the docking position.

3. The passenger boarding bridge according to claim 2, wherein
the controller is configured to:
when the cab has reached the target position, temporarily stop the cab from moving;
while the cab is temporarily stopped from moving, calculate the docking position; and
then cause the cab to start moving again toward the docking position.

4. The passenger boarding bridge according to claim 1, wherein
the target position is a position of the cab at which the cab is docked with the entrance, and
the controller is configured to stop the cab from moving when the cab has reached the target position.

5. The passenger boarding bridge according to claim 1, further comprising a lifting/lowering mechanism controlled by the controller and configured to lift and lower the cab, wherein
the entrance position calculator is configured to calculate, based on the image of the entrance, an upward/downward moving amount of the cab for adjusting a height of the cab to a height of the entrance, and
the controller is configured to lift and lower the cab based on the upward/downward moving amount of the cab, which is calculated by the entrance position calculator.

6. The passenger boarding bridge according to claim 1, further comprising a pair of distance sensors that are mounted to right and left sides of the distal end part of the cab, respectively, the distance sensors each being configured to measure a distance from the aircraft, wherein
the controller is configured to rotate the cab, such that measurement values from the pair of respective distance sensors are equalized.

7. The passenger boarding bridge according to claim 1, further comprising an aircraft detector configured to detect, when the cab is at the standby position, that the aircraft has arrived and stopped at a predetermined aircraft parking area, wherein
the entrance position calculator is configured to start operating when the aircraft detector has detected that the aircraft has arrived and stopped at the predetermined aircraft parking area.

8. The passenger boarding bridge according to claim 1, further comprising a notifier mounted to the cab, the notifier being configured to notify a crew member of the aircraft that the docking of the cab with the entrance of the aircraft has been completed, wherein
the controller is configured to cause the notifier to notify that the docking has been completed when the cab has been docked with the entrance.

9. The passenger boarding bridge according to claim 1, further comprising:
a front wheel image capturing camera mounted to the cab and configured to capture an image of a front wheel of the aircraft and a vicinity around the front wheel; and
an aircraft type determiner configured to determine an aircraft type of the aircraft by comparing the image of the front wheel of the aircraft and the vicinity around the front wheel, the image being captured by the front wheel image capturing camera when the cab is at the standby position, with each of shape patterns of a front wheel of an aircraft and a vicinity around the front wheel, the shape patterns being prestored for respective aircraft types.

10. The passenger boarding bridge according to claim 1, further comprising a pair of laser distance meters that are mounted to right and left sides of the distal end part of the cab, respectively, the laser distance meters each being configured to measure a distance from the aircraft, wherein
when seen in plan view, a laser-emitting direction of each of the laser distance meters coincides with an image-capturing direction of the entrance image capturing camera.

11. The passenger boarding bridge according to claim 1, wherein the entrance image capturing camera is installed in the cab at a position above a surface of a floor of the cab, and an installation position and an image-capturing direction of the entrance image capturing camera are fixed in relation to the cab, and the entrance image capturing camera is configured such that, when seen in plan view, the image-capturing direction of the entrance image capturing camera is orthogonal to a bumper, which is provided at the distal end part of the cab.

12. The passenger boarding bridge according to claim 1, wherein the entrance position calculator is configured to:

detect the entrance of the aircraft based on a shape of a corner of a door of the entrance, whose image is captured by the entrance image capturing camera; and detect a boundary point between a curved portion of the corner of the door and a straight portion that is continuous with the corner, and calculate the horizontal positional information of the entrance based on the boundary point.

13. The passenger boarding bridge according to claim 12, wherein the entrance position calculator is configured to detect the entrance based on:

the shape of the corner of the door, whose image is captured by the entrance image capturing camera; and a shape of a reinforcing plate that is present immediately below the door, whose image is captured by the entrance image capturing camera.

\* \* \* \* \*